United States Patent
Martell et al.

(10) Patent No.: US 6,917,876 B2
(45) Date of Patent: Jul. 12, 2005

(54) ROUTE GUIDANCE FOR VEHICLES

(75) Inventors: David Kenneth Martell, Shillington (GB); Jeffrey Solomon, Flitwick (GB)

(73) Assignee: Trafficmaster plc, Bedfordshire (GB)

( * ) Notice: Subject to any disclaimer, the term of this patent is extended or adjusted under 35 U.S.C. 154(b) by 0 days.

(21) Appl. No.: 10/138,418

(22) Filed: May 6, 2002

(65) Prior Publication Data

US 2003/0216859 A1 Nov. 20, 2003

(30) Foreign Application Priority Data

May 4, 2001 (GB) .............................................. 0110890

(51) Int. Cl.⁷ ............................ G06F 19/00; G06F 7/00
(52) U.S. Cl. ....................... 701/201; 701/207; 455/403; 342/357.01; 342/454
(58) Field of Search ................................ 701/210, 200, 701/201, 202, 205, 207, 208–211, 213, 117, 118, 119; 455/403, 466, 404.2, 439, 440, 457, 90.2, 41.2; 342/457, 451, 454, 357.01, 357.06, 357.1

(56) References Cited

U.S. PATENT DOCUMENTS 6,028,553 A * 2/2000 Oberstein .................... 342/457
6,094,956 A * 8/2000 Vodopyanov et al. .......... 72/110
6,295,449 B1 * 9/2001 Westerlage et al. ....... 455/422.1
6,304,816 B1 * 10/2001 Berstis ........................ 701/117
6,480,783 B1 * 11/2002 Myr ........................... 701/117
2001/0029425 A1 * 10/2001 Myr ........................... 701/200
2003/0014181 A1 * 1/2003 Myr ........................... 701/117
2003/0060973 A1 * 3/2003 Mathews et al. ........... 701/209

* cited by examiner

Primary Examiner—Thomas G. Black
Assistant Examiner—Ronnie Mancho
(74) Attorney, Agent, or Firm—William D. Hall

(57) ABSTRACT

A route guidance system for vehicles comprises central computing apparatus (6), transmitting apparatus (1) by way of which the central computing apparatus (6) is informed of the positions of respective vehicles on a road network and by way of which the vehicles are supplied with route guidance data calculated by the central computing apparatus as to the best routes for the respective vehicles to take to respective desired destinations, the transmitting apparatus (1) including transmitting devices (4) for carrying by the respective vehicles and by way of which the central computing apparatus (6) is informed as to the desired destinations, computing apparatus (8) serving to inform the central computing apparatus (6) as to traffic congestion on the network, and speech synthesisers (4) for carrying by the respective vehicles and arranged to speak instructions to the drivers of respective vehicles as to the routes to be taken to their respective desired destinations.

49 Claims, 1 Drawing Sheet

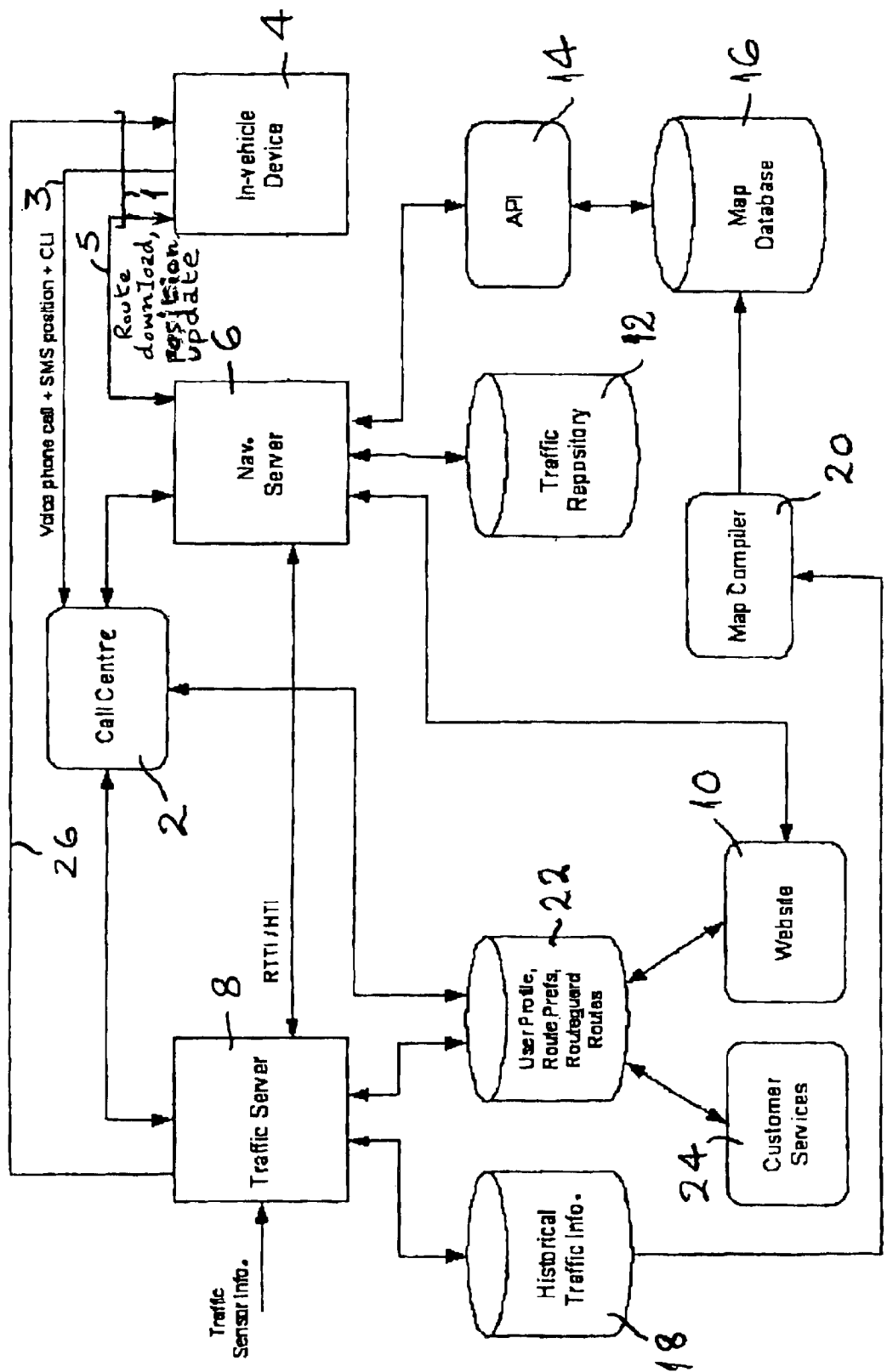

ROUTE GUIDANCE FOR VEHICLES

This invention relates to a route guidance system for vehicles.

According to one aspect of the present invention, there is provided a route guidance system for vehicles, comprising central computing apparatus, transmitting apparatus by way of which the central computing apparatus is informed of the positions of respective vehicles on a road network and by way of which the vehicles are supplied with route guidance data calculated by the central computing apparatus as to the best routes for the respective vehicles to take to respective desired destinations, said transmitting apparatus including transmitting devices for carrying by the respective vehicles and by way of which the central computing apparatus is informed as to their respective desired destinations, informing apparatus serving to inform the central computing apparatus as to traffic congestion on said network, and presenting devices for carrying by the respective vehicles and arranged to present respective instructions to the drivers of respective vehicles as to the routes to be taken to their respective desired destinations.

According to a second aspect of the present invention, there is provided a route guidance method for vehicles, comprising informing central computing apparatus of the positions of respective vehicles on a road network, informing said central computing apparatus as to traffic congestion on said network, informing said central computing apparatus as to the respective desired destinations of vehicles, supplying to the vehicles route guidance data calculated by the central computing apparatus as to the best routes for the respective vehicles to take to their respective desired destinations, and presenting respective instructions to the drivers of respective vehicles as to the routes to be taken to their respective desired destinations.

Owing to these aspects of the invention, drivers can be informed as to the best routes for their vehicles to take to their respective destinations, in such manner that traffic congestion pertinent to the routes is taken into account.

Advantageously, the transmitting apparatus transmits to a vehicle a short burst of route guidance data relating to the best route to the desired destination of the vehicle and then ceases transmitting route guidance data to that vehicle, preferably ceases transmitting to that vehicle any data whatsoever, unless and until a need for further transmission arises, for example the traffic congestion pertinent to the given route changes significantly.

Thus, according to a third aspect of the present invention, there is provided a route guidance system for vehicles, comprising central computing apparatus, transmitting apparatus by way of which the central computing apparatus is informed of the positions of respective vehicles on a road network and by way of which the vehicles are supplied with route guidance data calculated by the central computing apparatus as to the best routes for the respective vehicles to take to respective desired destinations, said transmitting apparatus including transmitting devices for carrying by the respective vehicles and by way of which the central computing apparatus is informed as to their respective desired destinations, and presenting devices for carrying by the respective vehicles and arranged to present respective instructions to the drivers of respective vehicles as to the routes to be taken to their respective desired destinations, and wherein, in respect of each vehicle, said transmitting apparatus provides a channel of communication which is opened to transmit said route guidance data to the vehicle in a short burst and is then closed, so that transmission to the vehicle via said channel ceases, unless and until a need for further transmission via said channel to said vehicle arises.

Similarly, according to a fourth aspect of the present invention, there is provided a route guidance method for vehicles, comprising informing central computing apparatus of the positions of respective vehicles on a road network, informing said central computing apparatus as to the respective desired destinations of vehicles, supplying to the vehicles route guidance data calculated by the central computing apparatus as to the best routes for the respective vehicles to take to their respective desired destinations, and presenting respective instructions to the drivers of respective vehicles as to the routes to be taken to their respective desired destinations, said supplying of said route guidance data to the vehicles comprising, for each vehicle, opening a channel of communication to transmit the route guidance data to the vehicle in a short burst and then closing said channel of communication so that transmission to that vehicle via said channel ceases, unless and until a need for further transmission via said channel to said vehicle arises.

A particular advantage of these two aspects of the invention is that the transmission channel need not be kept permanently open.

Moreover, it is advantageous if, when a driver of a vehicle wishes to inform the central computing apparatus of his desired destination, that apparatus is informed by way of a human operator to whom the desired destination is communicated by presenting means, preferably verbal and aural, and who not only feeds the relevant information into the central computing apparatus, but also communicates orally with the driver. In this way, the driver does not need to communicate with the central computing apparatus by way of a key pad, for example, and he has the comfort of dealing with a fellow human being.

If desired, upon the central computing apparatus being given the desired destination of a vehicle, the driver is informed as to the likely journey time.

In order that the invention may be clearly and completely disclosed, reference will now be made, by way of example, to the accompanying drawing which shows a diagram of a route guidance system for road vehicles.

Referring to the drawing, the system includes an off-board call centre 2 with which respective in-vehicle devices (of which one is shown and reference 4) can communicate via respective connections 3 of respective channels 1 of communication provided by a mobile telephone network. The in-vehicle devices are installed in respective vehicles of subscribers to the system and each device contains a GPS (Global Positioning System) receiver, a mobile telephone device, a speech synthesiser, a control microprocessor and a memory for speech synthesis. The memory of the device 4 stores a vocabulary of words and phrases. Each word or phrase is activated by a token in a compressed data message supplied by the computer 6 via a connection 5 and giving a calculated best route to a desired destination. The compressed data message is received by the in-vehicle device 4 at the commencement of the journey and comprises a stream of what are called "route points", which are GPS positions along the best route, the message including, for some of the route points, respective strings of tokens. For any best route, route points are provided frequently and in particular at every position at which an instruction to the driver is required to be made (for every manoeuvre that the driver is required to make, there may be up to three route points where instructions are given and in advance of the actual position where the manoeuvre must be made), and both before and after each possible diversion from the best route, and, in any case, at intervals not greater than, say, 1 mile. A string of tokens generates speech in at least one spoken sentence by assembling the words and phrases in the order that the relevant tokens are triggered by the arrival of the vehicle at a given latitude and longitude.

A human operator in the call centre 2 and an off-board central computer 6 for route guidance can communicate with each other, whilst the operator and an off-board central computer 8 for traffic congestion can also communicate with each other. The computer 8 receives information as to traffic congestion from a number of sources, such as roadside speed sensors and traffic reports for a road network. The computers 6 and 8 can also intercommunicate so that the computer 8 can supply to the computer 6 RTTI (real time traffic information) and HTI (historical traffic information). HTI is formatted traffic information that has been compiled over preceding weeks and months as an output of the computer 8.

The computer 6 intercommunicates with a website 10 so that the user can access the computer 6 via the website 10 to supply route preferences in particular; with an off-board traffic repository 12 which stores historical traffic information and road closures data that overrides the default link impedances (speeds) from an off-board map database 16; and with an off-board API (application programming interface) 14 which provides an interface to the map database 16. The API intercommunicates with the map database 16 via requests and responses. The map database 16 has, in effect standard default link impedances which are dependent upon the expected speeds of traffic along respective links of the road network. The computer 8 intercommunicates with an off-board historical traffic information database 18 so that the computer 8 can access the database 18 to supply HTI to the database 18 which stores HTI and which supplies HTI to an off-board map compiler 20 which is used to format map data from an independent vendor together with RTTI, HTI and the standard impedance (speed) for each road link. The map compiler 20 in turn communicates with the map database 16. The computer 8 also intercommunicates with an off-board database 22 so that the computer 8 can access the database 22 to supply user data to the database 22 and to update RTTI and HTI relevant to the routes. The database 22 stores data as to the user's profile (such as the user's name and address and his type of vehicle), the user's preferred routes (such as the shortest route, the fastest route, or a route using motorways or avoiding motorways), and predefined routes for which the user would wish to be alerted to changing traffic conditions. The database 22 also intercommunicates with the operator in the call centre 2 so that the operator can access the information in the database and can amend it at the request of the user; with the website 10 so that the user can access via the website the information in the database 22 and can amend it via the website; and with a customer service department 24 so that the department can access the information in the database and can amend it as required. The computer 8 can also communicate directly with each in-vehicle device via a connection 26. For ease of explanation the connections 3, 5 and 26 for one device 4 are shown as separate connections but, in practice, they will all be a single channel 1 of communication, for example a single mobile telephone connection.

The method of operation of the system is as follows. A driver in a vehicle uses the device 4 to telephone the call centre operator, giving his intended destination, while the device 4 supplies automatically over the connection 5 to the computer 6 initially its CLI (calling line identity) and then the GPS position of its vehicle. The operator supplies the desired destination to the computer 6, which calculates the best route, taking into account the user's route preferences and also the traffic conditions, particularly traffic congestion, as supplied by the computer 8 and the repository 12. The computer 6, via the connection 5, downloads in a single transmission to the device 4 a compressed data message including all route points in respect of the entire best route to the desired destination, these route points including "trigger" points along the route where strings of tokens attached to the trigger points will cause the driver to be given spoken instructions by the speech synthesiser. The route points included in the compressed data message are representations of respective positions, i.e. latitudes and longitudes, such that, when the vehicle attains a particular position, i.e. latitude and longitude, as determined by the GPS receiver, the appropriate instructions are given by the speech synthesiser. The communication channel 1 is then closed, so that the computer 6 ceases to communicate with the device 4 for the rest of the journey, unless the driver requests a different route or destination, or unless traffic conditions have changed, in which case the user is alerted of that change by the channel 1 being re-opened. At each trigger point, identified by its GPS position, the control microprocessor in the device 4 identifies the relevant position, whereupon the relevant token(s) cause(s) the speech synthesiser to instruct the driver as to what action to take (for example, at a roundabout, "turn left", "turn right", or "straight over"). If the driver is alerted to a change of traffic conditions by the computer 8 re-opening the channel 1, he can, by simply pressing a button of the device 4, request to have a new best route calculated and downloaded from the computer 6 in a new compressed data message.

If the driver switches off the vehicle ignition, the route is retained for, say, one hour and navigation is resumed when the vehicle moves off again. Beyond one hour, the device 4 automatically re-sets and the driver will need to re-start the route guidance method from scratch.

The device 4 internally checks that the vehicle has not left the best route. In the compressed data stream which has been downloaded to the device 4, the distance between each pair of route points is defined. The device 4 continuously checks the distance actually travelled from the first route point of a pair and, if the vehicle is detected as having travelled a greater distance than the reference distance between the two route points without having reached the second point of the pair, the device 4 warns the driver by a spoken message from the speech synthesiser that he has left the best route. The driver may then request a re-route to the desired destination by pressing the button on the device 4 to open the channel 1 and obtain a new best route from the computer 6. Alternatively, if the user has configured on the website 10 that automatic re-routing is required, then the device 4 will automatically request a new best route by opening the channel 1 and communicating with the computer 6 when it detects that the vehicle has left the best route.

The system described with reference to the drawing has the advantages of being relatively easy to use and of being relatively inexpensive both as regards the cost of equipment (because a minimal amount of equipment is provided in-vehicle) and the running costs (particularly because the channel of communication between the computer 6 and the in-vehicle device 4 is open only when necessary and for a very short time period).

We claim:

1. A route guidance system for guiding a driver of a vehicle to a desired destination on a road network, comprising:

a central computer adapted to calculate route guidance data providing a route for the vehicle to the desired destination;

means for supplying the vehicle with the route guidance data calculated by the central computer, providing a channel of communication which is opened to transmit said route guidance data to the vehicle in a short burst and is then closed, so that transmission to the vehicle via said channel ceases, unless and until a need for further transmission via said channel to the vehicle arises;

means far receiving the route guidance data calculated by the casual computer; and means for presenting respective instructions to the vehicle as to the route to be taken to the desired destination.

2. A system according to claim 1 also including means for communicating with the central computer in order to inform the central computer of the position of the vehicle on the road network and the desired destination of the vehicle.

3. A system according to claim 2, wherein the means for supplying the route guidance data serves to transmit route guidance data corresponding to the entire calculated route from the position of the vehicle to the desired destination.

4. A system according to claim 3, wherein said means for supplying the vehicles with route guidance data not only serves to transmit said route guidance data in said short burst but also then ceases transmitting to the vehicle any data whatsoever, unless said until said need arises.

5. A system according to claim 2, wherein said communicating means is usable by the alerted driver to cause the central computer to be requested to supply the vehicle with route guidance data for a new route taking into account the traffic congestion changes.

6. A system according to claim 2, wherein the means for communicating with the central computer and the means for supplying the vehicle with route guidance data use a single channel of communication.

7. A system according to claim 1 wherein the route guidance data comprises position data identifying a plurality of route points along the calculated route for the vehicle from the actual position of the vehicle on the road network to the desired destination.

8. A system according to claim 7 wherein the plurality of route points includes a set of route points associated with each of a plurality of manoeuvres required to be taken by the driver, the set of route points including up to three route points at which one of said respective instructions to the driver is required to be given.

9. A system according to claim 8 wherein the set of route points associated with each of the plurality of manoeuvres includes a route point coinciding with the point at which the manoeuvre is required to be taken by the driver.

10. A system according to claim 7 wherein the plurality of route points includes a set of route points associated with each of a plurality of possible diversions from the calculated route, the set of route points including at least one route point before the possible diversion and at least one route point after the possible diversion.

11. A system according to claim 1 further including means for informing at least one of the central computer and the driver as to traffic congestion on said network.

12. A system according to claim 11, further including means for storing historical traffic information, and a map database in which representative data representing expected speeds of traffic along respective links of the road network is stored, the representative data in the map database forming the basis for calculation by the central computer of said routes unless said central computer overrides said representative data with historical traffic information from said historical traffic information storing means or with real time traffic information provided by the inf rming means.

13. A system according to claim 12, wherein said map database stores said representative data in the form of default road link impedances, and said central computer overrides said representative data by changing said impedances and then calculates a new route for the vehicle taking into account the changed impedances.

14. A system according to claim 11, wherein the informing means alerts the driver to changes in traffic congestion on said network along its calculated route.

15. A system according to claim 14, wherein the information as to change in traffic congestion and the route guidance data are supplied through a single channel of communication.

16. A system according to claim 15, wherein the channel of communication opens automatically upon detection of a change in traffic congestion.

17. A system according to claim 11, wherein said informing means serves to inform the central computer of changes in traffic congestion on said network and said central computer serves to automatically supply to the vehicle, by way of said means for supplying route guidance data, a new calculated route taking into account the traffic congestion changes.

18. A system according to claim 1, wherein said central computer serves to supply said route guidance data in the form of a compressed data message comprised of a stream of route points along the calculated route.

19. A system according to claim 18, wherein said presenting means includes a speech synthesiser and the data message includes, for at least some of the route points, respective strings of tokens representing words or phrases of respective spoken instructions to the driver.

20. A system according to claim 19, wherein a token string is triggered by the arrival of the vehicle at a route point and the sentence produced by the speech synthesiser is dependent on the order of the tokens in the string.

21. A system according to claim 18, further including, for carrying by the vehicle, a microprocessor and a GPS receiver connected to the microprocessor, the microprocessor serving to compare a reference distance in the form of the distance between first and second adjacent route points as supplied by said central computer with the actual distance travelled by the vehicle as supplied by the GPS receiver in order to indicate any significant diversion from the calculated route.

22. A system according to claim 21, also including means for communicating with the central computer in order to inform the central computer of the position of the vehicle on the road network and the desired destination of the vehicle, wherein the microprocessor serves to cause the driver to be warned in the event that said actual distance significantly exceeds said reference distance and said communicating means is usable by the warned driver to cause the central computer to be requested to supply to the vehicle, by way of said route guidance data supplying means, route guidance data for a new calculated route taking into account the diversion from the existing route.

23. A system according to claim 21, also including means for communicating with the central computer in order to inform the central computer of the position of the vehicle on the road network and the desired destination of the vehicle, wherein in the event that said actual distance significantly exceeds said reference distance, the microprocessor serves, by way of said communicating means, to cause the central computer to automatically supply to the vehicle, by way of said route guidance data supplying means, a new calculated route taking into account the diversion from the existing route.

24. A system according to claim 1, further including a call centre for manning by human operators and an arranged to be interposed between the driver and the central computer for relaying to the central computer information given orally by the driver as to the desired destination.

25. A route guidance system for guiding a driver of a vehicle to a desired destinations on a road network, comprising:
a central computer,
transmitting apparatus which informs the central computer of the positions of the vehicle on the road network and which supplies the vehicle with route guidance data calculated by the central computer as to a route for the vehicle to take to the desired destination, said transmitting apparatus including a transmitting device for carrying by the vehicle which inform the central computer as to the desired destination, said transmitting apparatus including a receiving device for carrying by the vehicles which receives the route guidance data calculated by the central computer, and
a presenting devices for carrying by the vehicle and arranged to present instructions to the driver of the vehicle as to the route to be taken to the desired destination, wherein said transmitting apparatus provides a channel of communication which is opened to transmit said route guidance data to the vehicle in a short burst and is then closed, so that transmission to the vehicle via said channel ceases, unless and until a need for further transmission via said channel to said vehicle arises.

26. A route guidance method for a vehicle, comprising:
supplying to the vehicle route guidance data calculated by a central computer as to the route for the vehicle to take to a desired destination by opening a channel of communication to transmit the route guidance data to the vehicle in a short burst and then closing said channel of communication so that transmission to that vehicle via said channel ceases, unless and until a need for further transmission via said channel to said vehicle arises; and
presenting instructions to the driver of the vehicle as to the route to be taken to the desired destination.

27. A method according to claim 26, including the further steps of informing the central computer of the position of the vehicle on a road network; and
informing said central computer as to the desired destination of the vehicle.

28. A method according to claim 27, whereby a single channel of communication is used to convey the route guidance data and the information as to position and desired destination of the vehicle.

29. A method according to claim 26 wherein the route guidance data comprises position data identifying a plurality of route points along the route for the vehicle from the actual position of the vehicle on the road network to the desired destination.

30. A method according to claim 29 wherein the plurality of route points include a set of route points associated with each of a plurality of manoeuvres required to be taken by the driver, the set of route points including up to three route points at which one of said respective instructions is presented to the driver.

31. A method according to claim 30 wherein the set of route points associated with each of the plurality of manoeuvres includes a route point coinciding with the point at which the manoeuvre is required to be taken by the driver.

32. A method according to claim 29 wherein the plurality of route points includes a set of route points associated with each of a plurality of possible diversions from the best route, the set of route points including at least one route point before the possible diversion and at least one route point after the possible diversion.

33. A method according to claim 26 further including informing at least one of said central computer and the driver as to traffic congestion on said network.

34. A method according to claim 33, wherein said informing of said central computer as to traffic congestion on said network includes informing said central computer of changes in traffic congestion on said network, said method further comprising alerting the driver to traffic congestion changes along the existing route for the vehicle.

35. A method according to claim 34, wherein the alerted driver causes the central computer to supply to the vehicle route guidance data for a new route taking into account the traffic congestion changes.

36. A method according to claim 33, wherein the central computer is informed as to traffic congestion on said network and changes in traffic congestion on said network, said method further including automatically supplying to said vehicle a new route taking into account the traffic congestion changes.

37. A method according to claim 33, whereby a single channel of communication in used to convey the information as to change in traffic congestion and the route guidance data.

38. A method according to claim 37, wherein the channel of communication opens automatically upon detection of a change in traffic congestion.

39. A method according to claim 26, wherein said supplying of said route guidance data to the vehicle comprises transmitting route guidance data for the entire route from the position of the vehicle on the road network to the desired destination.

40. A method according to claim 39, wherein following said supplying of said route guidance data to the vehicle, the transmission to the vehicle of any data whatsoever is ceased, unless and until said need arises.

41. A method according to claim 26, further including storing historical traffic information, storing representative data representing expected speeds of traffic along respective links of the road network, and using said representative data for calculation of said route by said central computer unless said central computer overrides said representative data with said historical traffic information or with real time traffic information as to said traffic congestion.

42. A method according to claim 41, wherein said storing of said representative data is in the form of default road link impedances and said representative data is overridden by changing said impedances.

43. A method according to claim 26, wherein said route guidance data is supplied in the form of a compressed data message comprised of a stream of route points along the best route.

44. A method according to claim 43, wherein said message includes, for at least some of said route points, respective strings of tokens representing words or phrases of respective spoken instructions to the driver and the strings of tokens are translated into speech by a speech synthesiser.

45. A method according to claim 44, wherein arrival of the vehicle at a route point triggers the speech synthesiser to produce a spoken sentence corresponding to the order of the tokens in the string.

46. A method according to claim 43, further including comparing a reference distance in the form of the distance between first and second adjacent ones of said route points with the actual distance travelled by the vehicle, to indicate any significant diversion from the existing route.

47. A method according to claim 46, wherein the driver is warned in the event that said actual distance significantly exceeds said reference distance and the warned driver causes the central computer to supply to the vehicle route guidance data for a new route taking into account the diversion from the existing route.

48. A method according to claim 46, wherein in the event that said actual distance significantly exceeds said reference distance, said central computer is caused automatically to supply to the vehicle a new route taking into account the diversion from the existing route.

49. A method according to claim 26, wherein information given orally to human operators by the driver as to the desired destination is relayed by the human operators to the central computer.

* * * * *

UNITED STATES PATENT AND TRADEMARK OFFICE
CERTIFICATE OF CORRECTION

PATENT NO. : 6,917,876 B2
APPLICATION NO. : 10/138418
DATED : July 12, 2005
INVENTOR(S) : David Kenneth Martell and Jeffrey Solomon It is certified that error appears in the above-identified patent and that said Letters Patent is hereby corrected as shown below:

Column 5, line 9, "means far receiving" should read --means for receiving--.

Column 5, line 10, "the casual computer" should read --the central computer--.

Column 5, line 24, "unless said until" should read --unless and until--.

Column 5, line 67, "the inf rming means" should read --the informing means--.

Column 7, line 2, "and an arranged" should read --and arranged--.

Column 7, line 7, "to a desired destinations" should read --to a desired destination--

Column 7, line 16, "which inform the central computer" should read --which informs the central computer--

Column 7, line 21, "a presenting devices" should read --a presenting device--.

Signed and Sealed this

Twenty-second Day of January, 2008

JON W. DUDAS
*Director of the United States Patent and Trademark Office*